Jan. 3, 1961 L. A. FREEDMAN 2,967,236

SIGNAL RECEIVING SYSTEMS

Filed Oct. 10, 1957 2 Sheets-Sheet 1

INVENTOR.
LARRY A. FREEDMAN
BY H. O. Newton
ATTORNEY

INVENTOR.
LARRY A. FREEDMAN
BY H. C. Newton
ATTORNEY 2,967,236

SIGNAL RECEIVING SYSTEMS

Larry A. Freedman, New Brunswick, N.J., assignor to Radio Corporation of America, a corporation of Delaware Filed Oct. 10, 1957, Ser. No. 689,443

1 Claim. (Cl. 250—20)

This invention relates to signal receiving systems and in particular to means for preventing signal overload in signal receiving systems using transistors.

Radio signal receiving systems, particularly of the type which use transistors as the active amplifying elements are subject to signal overload at high signal levels. Overload of the receiver distorts the signal which is, of course, undesirable. To prevent signal overload, various expedients have been suggested including the use of a diode which is connected in shunt with the signal path. The diode is reverse biased over the normal range of received signals and has no effect on the signal. The diode is forward biased during the reception of signals above a predetermined amplitude and provides a low impedance shunt path, thus preventing signal overload. Because of the non-linear characteristics of the diode when it is reverse biased it may introduce cross-modulation into the circuit performance.

It is accordingly an object of the present invention to provide an improved signal overload circuit for signal receiving systems, particularly of the type which use transistors.

It is another object of the present invention to provide an improved circuit for preventing signal overload and thus distortion in transistor signal receiving systems which does not adversely affect the cross-modulation performance.

To prevent signal overload of a signal receving system in accordance with the invention a variable impedance device such as a diode is connected in series signal conveying relation with a signal translating device of the system. Preferably, the diode is connected in series between an input terminal and the first stage of the receiver. The variable impedance device has a low impedance characteristic during the reception of low amplitude signals which enables substantially unattenuated signal translation between the input terminal and the translating device. The variable impedance device provides a high impedance in response to the reception of large amplitude signals to attenuate the signal and prevent overload of the receiver. That is, the variable impedance device or diode is biased in the forward direction during the reception of low amplitude signals and reverse biased by the receiver automatic gain control in response to the reception of large amplitude signals to attenuate higher amplitude signals and prevent signal overload.

The novel features that are considered characteristic of this invention are set forth with particularity in the appended claim. The invention itself, however, both as to its organization and method of operation, as well as additional objects and advantages thereof, will best be understood from the following description when read in connection with the accompanying drawing, in which:

Figure 1:
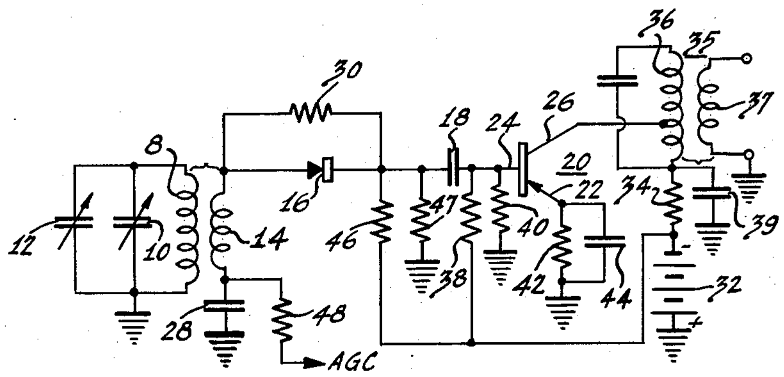
Figure 1 is a schematic circuit diagram of a transistor signal amplifying stage for a signal receiving system embodying the invention.

Referring now to the drawing, wherein like parts are indicated by like reference numerals throughout the figures, and referring particularly to Figure 1, an input circuit for a radio receiving system includes an antenna which may be of the well-known loop type having a signal pickup winding 8 which is adapted to receive an incoming carrier wave signal. To provide tuning over a selected frequency band, a tuning capacitor 10 and a trimmer capacitor 12 are connected in shunt with the antenna winding 8 and with each other. The received signal is coupled through an antenna secondary or coupling winding 14 and in accordance with the invention, a variable impedance device such as a diode 16 and a coupling capacitor 18 to the input electrode of a signal translating device. The signal translating device has been illustrated as a transistor 20, which may be the radio frequency amplifier of a signal receiving system, for example. The transistor 20, which may be considered to be of the P–N–P junction type, includes an emitter electrode 22 which is common to the input and output circuits of the transistor, an input or base electrode 24, and an output or collector electrode 26. The high signal voltage terminal of the antenna secondary or coupling wind.ng 14 is serially connected through the diode 16 and the coupling capacitor 18 to the base 24 of the transistor 20. The low signal voltage terminal of the antenna secondary winding 14 is connected to a point or reference potential or ground for radio frequency signals through a capacitor 28. The diode 16 may be and is, in the circuit illustrated, shunted by a resistor 30. The impedance of the resistor 30 is selected to just exceed the maximum impedance at which it is desired to have the diode present in the circuit. This limits the signal attenuation to a given value, which limits the signal to noise ratio of the circuit and more readily permits the interchanging of transistors in the circuit. By shunting the diode 16 with a 22,000 ohm resistor, for example, the maximum signal attenuation is limited to 30 decibels.

To supply direct energizing potentials for the transistor 20 and a forward bias voltage for the diode 16, a battery 32 is provided, the positive terminal of which is connected to the point of reference potential or ground for the circuit. The negative terminal of the battery 32 is connected through a decoupling resistor 34 and a portion of the primary winding 36 of an output transformer 35 to the collector 26. Output signals may be derived from the secondary winding 37 of the transformer 35. The resistor 34 and the battery 32 are by-passed by a by-pass capacitor 39. The negative terminal of the battery 32 is also connected through a bias resistor 38 to the base electrode 24 of the transistor 20. A resistor 40 is connected from the base 24 to ground and comprises, in combination with the resistor 38, a voltage divider for providing a fixed by-pass bias voltage for the transistor 20. To provide negative current feedback stabilization for the transistor 20 the emitter 22 is connected through a stabilizing resistor 42 to ground. The resistor 42 is by-passed for signal frequencies by a capacitor 44. The negative terminal of the battery 32 is also connected through a resistor 46 to the cathode of the diode 16. The cathode of the diode 16 is also connected to ground through a resistor 47 which comprises, with the resistor 46, a voltage divided for applying a fixed forward bias to the diode 16. To complete the circuit and to provide variable impedance control of the diode 16 in accordance with signal strength an automatic gain control potential (not shown) is applied through a resistor 48 and the antenna secondary winding 14 to the anode of the diode 16.

It is noted that the invention is illustrated with a transistor of N type conductivity. It should be understood, however, that P type conductivity transistors could be used if desired. If P type conductivity transistors are used, the diode 16 would be poled in the circuit in an opposite direction to that illustrated so that it would normally be biased in the forward direction by the positive collector supply voltage for the P type conductivity transistor.

In operation, the diode 16 is normally biased in the forward direction by the battery 32 and provides a relatively low impedance signal path between the input or antenna circuit and the base electrode 24 of the transistor 20. Accordingly, signals will be translated from the antenna and applied between the base 24 and emitter 22 of the transistor 20 substantially without attenuation. Upon receipt of a signal above a predetermined amplitude, an AGC voltage will be applied to the diode 16 through the resistor 48. This voltage will be selected to be of such polarity so as to reduce the forward bias and eventually reverse bias the diode 16. That is to say, the AGC voltage which is applied to the anode of the diode 16 opposes the voltage of the battery 32 and will eventually be more negative than the voltage which is applied to the cathode of the diode 16 from the bias battery 32. Accordingly, the diode 16 will be reverse biased as the AGC voltage becomes more negative as the strength applied signal increases. As the forward bias of the diode decreases its impedance will increase. Accordingly, signal translation between the antenna and the transistor 20 will be attenuated and signal overload of the receiver will be prevented.

Figure 2:
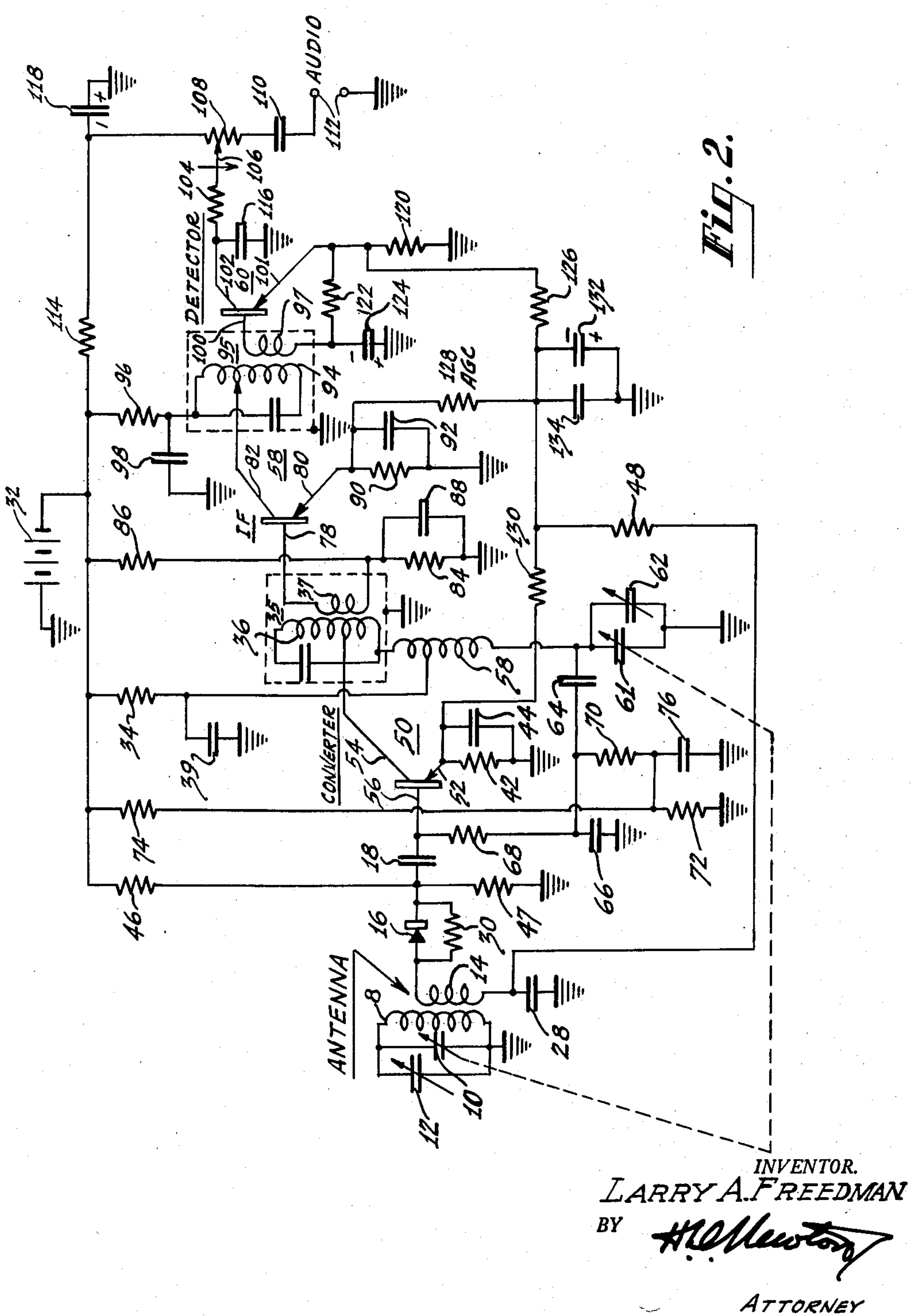
Figure 2 is a schematic circuit diagram of the converter, intermediate frequency, and detector stages of a signal receiving system embodying the invention; and, Figure 3 is a graph of field strength plotted against relative power output of a receiver circuit of the type illustrated in Figure 2.

In Figure 2, reference to which is now made, a radio signal receiving system includes in general an antenna the overload diode 16 a transistor 50 connected to convert the received signal to an intermediate frequency signal an intermediate frequency amplifier transistor 58 and a signal detector transistor 60. The antenna and the overload diode 16 are connected in a manner similar to that described above in connection with Figure 1. The transistor 50, which includes an emitter 52 a collector 54 and a base 56 and which has been illustrated as being of the P–N–P junction type, is connected to generate a local oscillator signal for mixing with the received modulated carrier wave signal. To this end, the collector 54 is connected through a portion of the primary winding 36 of the output transformer 35 and through an oscillator coil 58 and an oscillator tuning capacitor 61 to ground. The oscillator tuning capacitor 61 is ganged for unitary operation with the antenna tuning capacitor 10 and is shunted by an oscillator trimmer capacitor 62. The collector output signal of the transistor 50 is fed back by means of a capacitive voltage divider comprising a pair of capacitors 64 and 66 to the base 56 of the transistor 50. The capacitor 64 is connected from the junction of the oscillator tuning coil 58 and the tuning capacitor 60 through an isolating resistor 68 to the base 56 of the transistor 50. The capacitor 66 is connected from the junction of the capacitor 64 and the isolating resistor 68 to ground. The transistor 50 is biased in a manner similar to the transistor 20 in Figure 1. The collector 54 is connected with the negative terminal of the bias battery 32 through a portion of the primary winding 36 and the oscillator tuning coil 58 and the resistor 34. The base 56 is connected to ground through the resistors 68, 70, and 72, which comprises a voltage divider network for establishing a fixed base bias voltage for the transistor 50. The junction of the resistors 70 and 72 is connected to the negative terminal of the battery 32 through a resistor 74. The resistor 72 is by-passed by a capacitor 76.

The converter transistor 50 is connected to develop an oscillator signal by feeding back an output signal from the collector 54 to the base 56 through the oscillator feedback circuit. The oscillator signal so developed is mixed or heterodyned with the received carrier wave signal, which is applied between the base 56 and emitter 52 to develop an intermediate frequency signal. The intermediate frequency signal is coupled through the secondary winding 37 of the output transformer 35 to the base electrode 78 of the intermediate frequency amplifier transistor 58. The transistor 58 which may be considered to be of the P–N–P junction type also includes an emitter 80 and a collector 82 and as its base 78 connected to ground through the secondary winding 37 of the converter output transformer and a resistor 84. The junction of the resistor 84 and the secondary winding 37 is connected through a resistor 86 to the negative terminal of the battery 32. The resistor 84 is by-passed by a by-pass capacitor 88. The emitter 80 of the transistor 58 is connected to ground through a stabilizing resistor 90 which is by-passed by a by-pass capacitor 92. The collector 82 of the transistor 58 is connected through a portion of the primary winding 94 of a transformer 95 and a resistor 96 to the battery 32. The resistor 96 and the battery 32 are by-passed by a capacitor 98.

The amplified intermediate frequency signal is applied through the secondary winding 97 of the transformer 95 to the base 100 of the detector transistor 60, which is connected to derive the audio frequency signal from the applied intermediate frequency signal and to develop an AGC current for controlling the gain of the transistors 50 and 58 and the base voltage on the overload diode 16. The detector transistor 60 further includes an emitter 101 and a collector 102. The collector 102 is connected through a coupling resistor 104 to the variable tap of a volume control resistor 108. The volume control resistor is connected at one end through a coupling capacitor 110 to one of a pair of audio output terminals 112 the other of which is connected to ground. The other end of the volume control resistor 108 is connected through a decoupling resistor 114 to the negative terminal of the battery 32. By-pass capacitors 116 and 118 are connected from the junction of the collector 102 and the resistor 104 to ground and from the junction of the volume control resistor 108 and the resistor 114 to ground, respectively. The emitter 101 of the transistor 60 is connected to ground through a direct current feedback stabilizing resistor 120. To provide degeneration at audio frequencies for reducing distortion, a resistor 122 of relatively small resistance is connected from the emitter 101 through the secondary winding 97 to the base 100, and a capacitor 124 is connected from the junction of the secondary winding 97 and the resistor 122 to ground.

To provide gain control of the converter and I.F. transistor stages, the emitter 101 of the detector transistor 60 is connected through a resistor 126 and a resistor 128 to the emitter 80 of the transistor 58, and through the resistor 126 and a resistor 130 to the emitter 52 of the transistor 50. An AGC capacitor 132 is connected from the junction of the resistors 126 and 128 to ground and an I.F. by-pass capacitor 134 is connected in parallel with the AGC capacitor 132. By this arrangement an increase in the direct emitter current of the detector transistor 60 due to an increase in the amplitude of the received signal will decrease the emitter current and thus the gain of the transistors 50 and 58.

The emitter 101 of the detector transistor 60 is also connected, in accordance with the invention, through the resistor 126, the resistor 48, and the antenna coupling winding 14, to the anode of the overload diode 16. In operation, as the signal strength increases, the emitter current of the detector transistor 60 will increase and the voltage developed across the AGC capacitor 132 will become more negative. This negative voltage is applied to the anode of the diode 16. At first the AGC voltage reduces the forward bias across the diode 16 and eventually causes the bias across the diode 16 to be in the reverse direction. By reducing the forward bias across the diode the impedance of the diode will increase, thus causing signal voltage drop across the diode. The portion of the signal received from the antenna which is applied to the converter transistor 50 is then determined by the ratio of the impedance of the diode 16 to the parallel combination of the converter transistor 50 input impedance and the shunt impedances at the converter transistor 50 base electrode 56. For moderate signals, therefore, the diode 16 provides an additional gain control element and the AGC provided by the diode 16 is proportional to the ratio of the diode forward impedance to reverse impedance.

Figure 3:
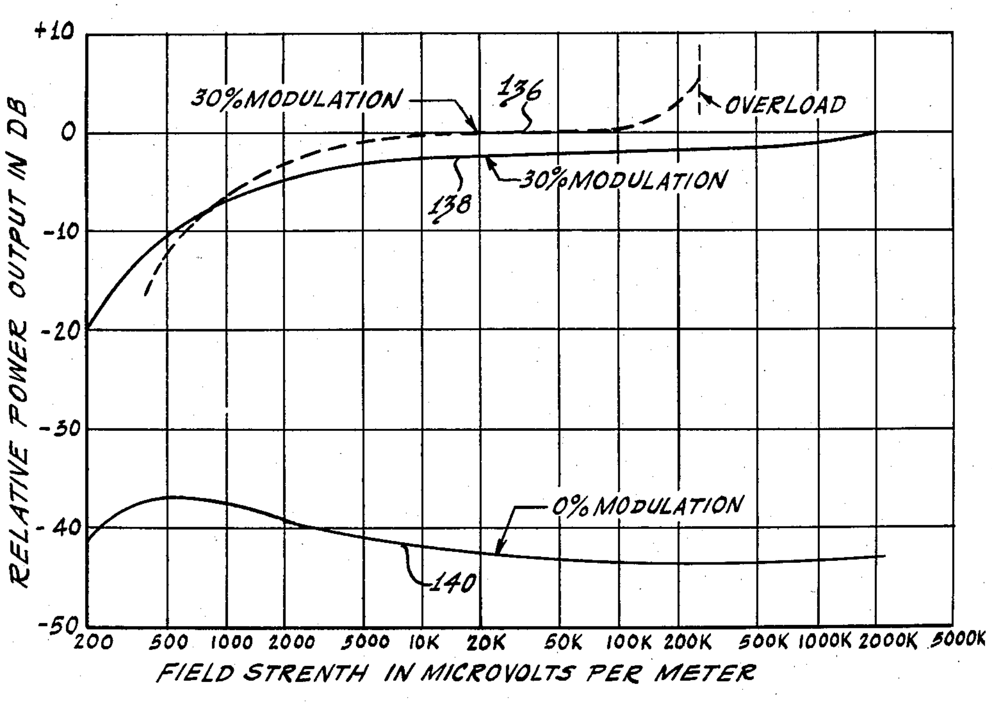

Figure 3, which is a graph in which relative power output in decibels has been plotted against field or signal strength in microvolts per meter, illustrates the effect of the overload diode 16 in the circuit to provide extended gain control and overload protection. The curve 136 illustrates the AGC characteristic at 30% modulation, of a receiver in which the overload diode is not connected. Overload occurs at approximately 200,000 microvolts per meter. The AGC characteristic of a receiver of the type illustrated in Figure 2 is shown by the curve 138. Overload has not occurred at the very high signal level of two volts per meter which represents an increase of approximately 20 decibels. The noise characteristic of a receiver of the type illustrated in Figure 2 has also been plotted and is indicated by the curve 140. It has also been found that the addition of the series diode to effectively prevent signal overload does not adversely effect the cross-modulation performance of the receiver.

While it should be understood that the circuit specifications may vary according to the design for any particular application, the following are included for the circuit of Figure 2 by way of example only:

| | |
|---|---|
| Battery **32** | —16.5 volts. |
| Transistors **50, 58,** and **60** | Type 2N47. |
| Diode **16** | Type 1N295. |
| Capacitors **18; 28; 39; 44; 76; 88; 98; 116; 134** | .01 microfarads each. |
| Capacitors **64** and **66** | 15 and 180 micromicrofarads, respectively. |
| Resistors **30; 34; 42; 46; 47; 48; 68; 70; 72; 74; 84; 86; 90; 96; 104; 108; 114; 120; 122; 126; 128;** and **130** | 22,000; 270; 1,000; 27,000; 2,200; 1,800; 1,000; 1,000; 2,700; 39,000; 2,700; 39,000; 680; 1,000; 220; 2,500; 220; 1,800; 56; 2,700; 470; and 910 ohms, respectively. |
| Capacitors **92; 118; 124;** and **132** | .1; 10; 50; and 4 microfarads, respectively. |

As described herein a signal receiving system is prevented from overloading at high signal levels by circuitry which is relatively simple yet extremely effective in operation.

What is claimed is:

In a signal receiving system the combination comprising, an antenna for said system for receiving a signal, a transistor, means serially coupling said antenna with said transistor including a diode, means forward biasing said diode for the reception of signals below a predetermined amplitude to provide a low impedance path for signal translation between said antenna and said transistor, automatic gain control means for reducing said forward bias and to provide a reverse bias for said diode in response to signals of increasing amplitude to attenuate signals applied to said transistor and prevent signal overload of said receiving system, and a resistor connected in parallel with said diode to limit the signal attenuation thereof and permit the interchanging of transistors in said system.

References Cited in the file of this patent

UNITED STATES PATENTS

| | | |
|---|---|---|
| 2,012,433 | Myers | Aug. 27, 1935 |
| 2,141,944 | Thompson | Dec. 27, 1938 |
| 2,774,866 | Burger | Dec. 18, 1956 |
| 2,789,164 | Stanley | Apr. 16, 1957 |
| 2,802,100 | Beck et al. | Aug. 6, 1957 |

FOREIGN PATENTS

| | | |
|---|---|---|
| 413,383 | Great Britain | July 19, 1934 |

OTHER REFERENCES

Article, "Transistor Radios," in "Radio and Television News," May 1956, page 68 et seq.